(12) United States Patent
Choi (10) Patent No.: US 6,859,726 B2
(45) Date of Patent: Feb. 22, 2005

(54) NAVIGATION APPARATUS AND METHOD FOR CALCULATING OPTIMUM TRAVEL ROUTE USING THE SAME

(75) Inventor: Yong-Ik Choi, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 47 days.

(21) Appl. No.: 10/607,098

(22) Filed: Jun. 25, 2003

(65) Prior Publication Data
US 2004/0158392 A1 Aug. 12, 2004

(30) Foreign Application Priority Data
Feb. 8, 2003 (KR) ................................. 10-2003-0008035

(51) Int. Cl.$^7$ ........................ G01C 19/00; G01C 21/30; G01C 21/32
(52) U.S. Cl. .......................... 701/209; 70/210; 70/213; 340/905
(58) Field of Search ............................... 701/209, 207, 701/210, 213, 211; 201/208; 340/995.12, 988, 995.13; 370/351, 220, 238, 349; 705/31

(56) References Cited

U.S. PATENT DOCUMENTS

| | | | | |
|---|---|---|---|---|
| 6,401,027 B1 | * | 6/2002 | Xu et al. | 701/117 |
| 6,421,606 B1 | * | 7/2002 | Asai et al. | 701/209 |
| 6,636,802 B1 | * | 10/2003 | Nakano et al. | 701/208 |
| 6,704,293 B1 | * | 3/2004 | Larsson et al. | 370/255 |

* cited by examiner

Primary Examiner—Thomas G. Black
Assistant Examiner—McDieunel Marc
(74) Attorney, Agent, or Firm—Dilworth & Barrese LLP (57) ABSTRACT

Disclosed are a navigation apparatus and a method for calculating an optimum travel route thereof. The calculating method comprises the steps of a) detecting present location information of a movable body in response to a user's request for the optimum travel route to a designated destination, b) detecting present link information corresponding to the present location information of the movable body from stored map data, c) detecting information of links neighboring the present link in the direction of the destination from the map data, d) calculating a cumulative travel time from the present location of the movable body to each neighboring link using the predetermined weighted values assigned to each of traveling directions of the present link information and the information of the neighboring links, e) selecting one optimum neighboring link information out of the neighboring link information detected from the map data according to the calculated cumulative travel time of each neighboring link, and f) repeating steps c) to e), subsequently detecting the optimum travel route from the selected optimum neighboring link information when a finally selected optimum neighboring link information includes destination information, and outputting the detected optimum travel route. The method for calculating the optimum travel route using the navigation apparatus of the present invention improves the probability that the vehicle requesting the optimum travel route is in the range of the optimum travel route provided by the navigation apparatus.

8 Claims, 7 Drawing Sheets

| MAP INFORMATION MANAGEMENT DB | (10) |
|---|---|
| LINK ID | (11) |
| DISTANCE | (12) |
| MEAN TRAVELING SPEED | (13) |
| DIRECTION INFORMATION | (14) |

FIG.3A

| NEIGHBORING LINK INFORMATION | (30) |
|---|---|
| LINK ID | (31) |
| PREVIOUS LINK ID | (32) |
| TRAVEL TIME INFORMATION | (33) |
| VIRTUAL TIME INFORMATION | (34) |
| FINAL TIME INFORMATION | (35) |
| CUMULATIVE TIME INFORMATION | (36) |

FIG.3B

| SELECTED LINK INFORMATION | (20) |
|---|---|
| LINK ID | (21) |
| PREVIOUS LINK ID | (22) |
| CUMULATIVE TIME INFORMATION | (23) |

| STEP | LINK ID | PREVIOUS LINK ID | CUMULATIVE TIME INFORMATION |
|---|---|---|---|
| STEP1 | A | - | 1 |
| STEP3 | B | A | 2 |
| STEP5 | C | B | 3 |
| STEP7 | R | B | 5 |
| ⋮ | ⋮ | ⋮ | ⋮ |

FIG.6

| STEP | LINK ID | LINK ID PREVIOUS | TURN INFORMATION | ACTUAL TRAVEL TIME INFORMATION | ACTUAL CUMULATIVE TIME INFORMATION | WEIGHTED VALUE | DEPARTURE WEIGHTED VALUE | LINK VIRTUAL TIME INFORMATION | CUMULATED VIRTUAL TIME INFORMATION | STATE |
|---|---|---|---|---|---|---|---|---|---|---|
| STEP2 | B | A | STRAIGHT DRIVE | 1 | 2 | S | SP | 1+S+SP | 2+S+SP(2) | ADDITION→SELECTION |
| | N | A | LEFT TURN | 1 | 2 | L | LP | 1+L+LP | 2+L+LP(8) | ADDITION |
| | N | A | LEFT TURN | 1 | 2 | L | LP | 1+L+LP | 2+L+LP(8) | |
| STEP4 | C | B | STRAIGHT DRIVE | 1 | 3 | S | — | 1+S | 3+2S+SP(3) | ADDITION→SELECTION |
| | R | B | LEFT TURN | 1 | 3 | L | — | 1+L | 3+L+S+SP(5) | ADDITION |
| | N | A | LEFT TURN | 1 | 2 | L | LP | 1+L+LP | 2+L+LP(8) | |
| STEP6 | R | B | LEFT TURN | 1 | 3 | L | — | 1+L | 3+L+S+SP(5) | SELECTION |
| | V | C | LEFT TURN | 1 | 4 | L | — | 1+L | 4+L+2S+SP(6) | ADDITION |

L : WEIGHTED VALUE ASSIGNED TO LEFT TURN
R : WEIGHTED VALUE ASSIGNED TO RIGHT TURN
S : WEIGHTED VALUE ASSIGNED TO STRAIGHT DRIVE
LP : WEIGHTED VALUE ASSIGNED TO LEFT TURN AROUND DEPARTURE POINT
SP : WEIGHTED VALUE ASSIGNED TO STRAIGHT DRIVE AROUND DEPARTURE POINT
RP : WEIGHTED VALUE ASSIGNED TO RIGHT TURN AROUND DEPARTURE POINT

FIG. 7

NAVIGATION APPARATUS AND METHOD FOR CALCULATING OPTIMUM TRAVEL ROUTE USING THE SAME

PRIORITY

This application claims priority to an application entitled "NAVIGATION APPARATUS AND METHOD FOR CALCULATING OPTIMUM TRAVEL ROUTE USING THE SAME", filed in the Korean Industrial Property Office on Feb. 8, 2003 and assigned Serial No. 2003-8035, the contents of which are hereby incorporated by reference.

BACKGROUND OF THE INVENTION

1. Field of the Invention

The present invention relates to a navigation apparatus, and more particularly to a method for calculating an optimum travel route using a navigation apparatus.

2. Description of the Related Art

Navigation apparatuses using a GPS (Global Positioning System) have been recently installed in movable bodies, i.e., various vehicles such as vessels, airplanes, cars, etc. The navigation apparatus receives radio waves representing latitude, longitude, altitude, etc. from a plurality of satellites of the GPS, thus calculating the present location of a movable body. The navigation apparatus displays map information including the present location of the movable body according to stored map data. That is, the conventional navigation apparatus provides to drivers various necessary information displayed via a screen, such as a present traveling speed of the movable body, a travel route designated by a driver prior to traveling, and an optimum travel route to his/her desired destination, using the information received from the GPS.

Figure 1:
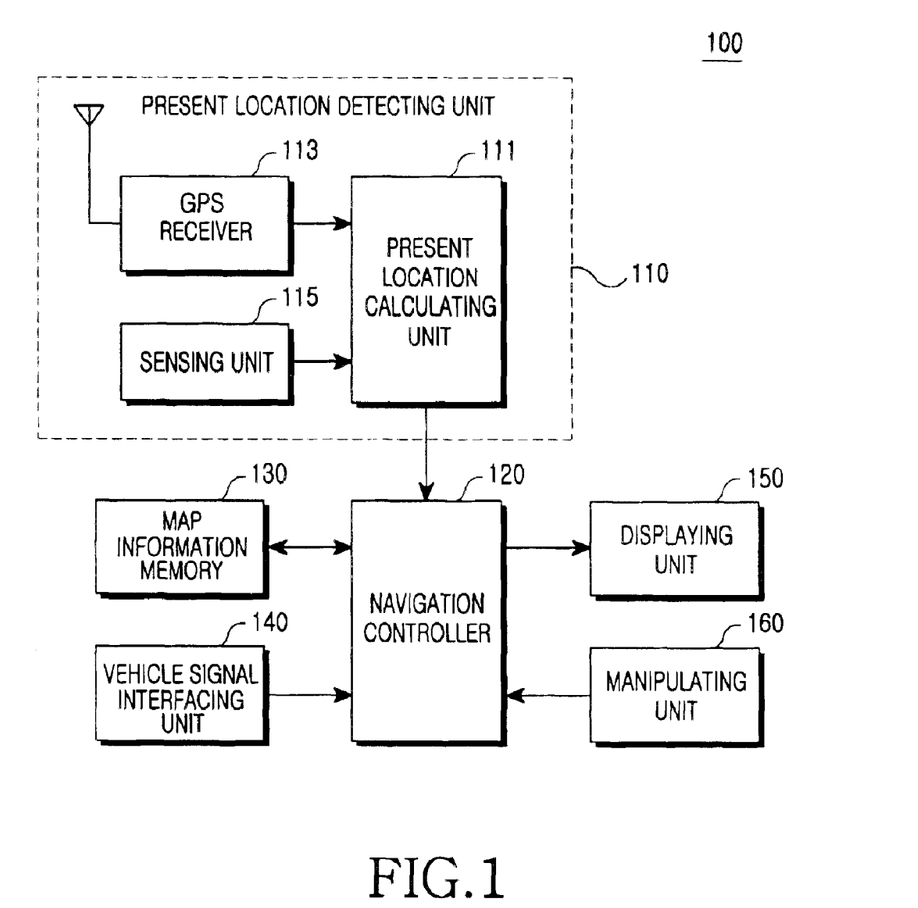
FIG. 1 is a block diagram of a conventional navigation apparatus.

FIG. 1 is a functional block diagram of a conventional navigation apparatus 100. With reference to FIG. 1, a present location detecting unit 110 includes a present location calculating unit 111, a GPS receiver 113, and a sensing unit 115. The present location detecting unit 110 detects the present location of a movable body. The GPS receiver 113 receives radio waves transmitted from a plurality of satellites of the GPS via an antenna, thereby calculating a virtual coordinate of the present location of the movable body. The sensing unit 115 includes a gyro sensor and a speed sensor. The sensing unit 115 senses the turning angle and speed of a vehicle via the gyro and speed sensors. The present location calculating unit 111 calculates a present virtual location of the vehicle based on the turning angle and speed of the vehicle, transmitted from the sensing unit, 115. Then, the present location calculating unit 111 selects either the virtual coordinate of the present location of the vehicle transmitted from the GPS receiver 113, or the calculated virtual location of the vehicle. Here, the present location calculating unit 111 calculates not only the present location of the vehicle but also the traveling information such as the traveling speed and direction of the vehicle. The calculated traveling information of the vehicle is transmitted to a navigation controller 120. A map information memory 130 stores the map information and additional information. A manipulating unit 160 includes a plurality of keys, and supplies a key order inputted by a driver to the navigation controller so as to operate the navigation apparatus 100. A displaying unit 150 displays the map information read by the map information memory 130 and status of the navigation apparatus 100 while performing various functions. Based on the traveling information obtained by the present location calculating unit 111, the navigation controller 120 reads map data of surrounding areas from the map information memory 130, and then displays the read data on the displaying unit 150. A vehicle signal interfacing unit 140 transmits state information of the vehicle to a navigation controller 18, where state information may be, for example, whether an air-bag set is available in the vehicle, whether the engine is functioning properly, or how much fuel remains in the fuel tank.

When a driver designates a desired destination and requests travel route information to the destination, the navigation controller 120 calculates an optimum travel route from the present location of the driver's vehicle or a departure point designated by the driver to the destination, i.e., the shortest travel route, and then displays the calculated result of the optimum travel route on a screen. For example, the calculated optimum travel route is displayed on a map on the screen.

During travel, the conventional navigation apparatus installed in the vehicle considers the present location of the vehicle as the departure point when the driver requests the optimum travel route information. Then, the conventional navigation apparatus calculates the optimum travel route from the departure point to the destination, and displays the calculated result. When the conventional navigation apparatus calculates the optimum travel route, location information of the vehicle that changes during the calculation time is not considered. Therefore, at a point of time when the conventional navigation apparatus provides the calculated result of the optimum travel route, the vehicle that has requested the optimum travel route has moved to a location different from the original departure point. As a result, the vehicle, which has requested the optimum travel route, may be located outside of the calculated optimum travel route.

In order to solve such a problem, the conventional navigation apparatus determines a virtual location of the vehicle predicted after the time taken to calculate the optimum travel route based on the traveling speed and direction information of the vehicle which has requested the optimum travel route. Then, the conventional navigation apparatus considers the above-determined virtual location as a departure point, thus calculating the optimum travel route from the virtual location to the destination. In this case, the conventional navigation apparatus does not consider characteristics of roads but considers only the traveling speed and direction of the vehicle, and considers the virtual location past a certain distance from the present location of the vehicle as the departure point. Therefore, the departure point may be actually unusable.

As described above, using the conventional navigation apparatus, the vehicle which has requested the optimum travel route may be located outside of the optimum travel route obtained by the navigation apparatus installed in the vehicle.

When the vehicle moves to a next link of the map, in cases where it makes a right or left turn, the actual travel time of the vehicle becomes longer than the mean travel time stored in the map data. However, the conventional navigation apparatus does not consider this point, but uses only the travel time information calculated by the travel distance in detecting the optimum travel route. Therefore, although the travel time via the optimum travel route calculated by the conventional navigation apparatus is detected to be comparatively short, the actual travel time of the vehicle may be longer than the calculated travel time.

SUMMARY OF THE INVENTION

Therefore, it is an object of the present invention to provide a navigation apparatus and a method for calculating an optimum travel route using the navigation apparatus, in order to increase the probability that a vehicle having requested the optimum travel route is in the range of the obtained optimum travel route.

It is another object of the present invention to provide a navigation apparatus and a method for calculating an optimum travel route using the navigation apparatus, in order to minimize the probability that a departure point of the vehicle having requested the optimum travel route is deviated from the obtained optimum travel route.

It is yet another object of the present invention to provide a navigation apparatus and a method for calculating an optimum travel route using the navigation apparatus, in which the optimum travel route from a present location of a vehicle to a desired destination is determined using predetermined weighted values assigned to a present link and neighboring links on a map according to travel directions.

In accordance with one aspect of the present invention, the above and other objects can be accomplished by the provision of a navigation apparatus comprising a present location detecting unit for detecting a present location information of a movable body in response to a user's request for an optimum travel route to a designated destination; a present link detecting unit for receiving the present location information from the present location detecting unit, and detecting a present link information corresponding to the present location from stored map data; a neighboring link detecting unit for receiving the present link information from the present link detecting unit, and detecting information corresponding to links neighboring the present link from the stored map data; a neighboring link information storing unit for receiving and storing therein the detected results from the present link detecting unit and the neighboring link detecting unit; a selected link information storing unit for storing an optimum neighboring link information selected out of the corresponding neighboring link information stored in the neighboring link information storing unit; a route calculating unit for receiving the present link information and the corresponding neighboring link information from the neighboring link information storing unit, calculating a cumulative travel time from the present location of the movable body to each neighboring link using predetermined weighted values assigned to a traveling direction of each of the present link information and the corresponding neighboring link information, selecting an optimum neighboring link information, and storing the selected optimum neighboring link information in the selected link information storing unit; and an optimum route detecting unit for determining whether the selected link information storing unit stores the link information including a destination information, detecting the link information including the destination information from the selected link information storing unit and corresponding neighboring link information from a link including the destination to a departure point, and outputting an optimum travel route according to the link informations.

In accordance with another aspect of the present invention, there is provided a method for calculating an optimum travel route using a navigation apparatus, comprising the steps of a) detecting present location information of a movable body in response to a user's request for the optimum travel route to a designated destination; b) detecting present link information corresponding to the present location information of the movable body from stored map data; c) detecting information of links neighboring the present link in the direction of the destination from the map data; d) calculating a cumulative travel time from the present location of the movable body to each neighboring link using predetermined weighted values assigned to each of traveling directions of the present link information and information of the neighboring links; e) selecting one optimum neighboring link information out of the neighboring link information detected from the map data according to the calculated cumulative travel time of each neighboring link; and f) repeating steps c) to e), subsequently detecting the optimum travel route from the selected optimum neighboring link information when a finally selected optimum neighboring link information includes destination information, and outputting the detected optimum travel route.

BRIEF DESCRIPTION OF THE DRAWINGS

The above and other objects, features and other advantages of the present invention will be more clearly understood from the following detailed description taken in conjunction with the accompanying drawings, in which:

FIGS. 5 to 7 illustrate an exemplary process for calculating the optimum travel route in accordance with one embodiment of the present invention, more specifically.

DETAILED DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

Figure 2:
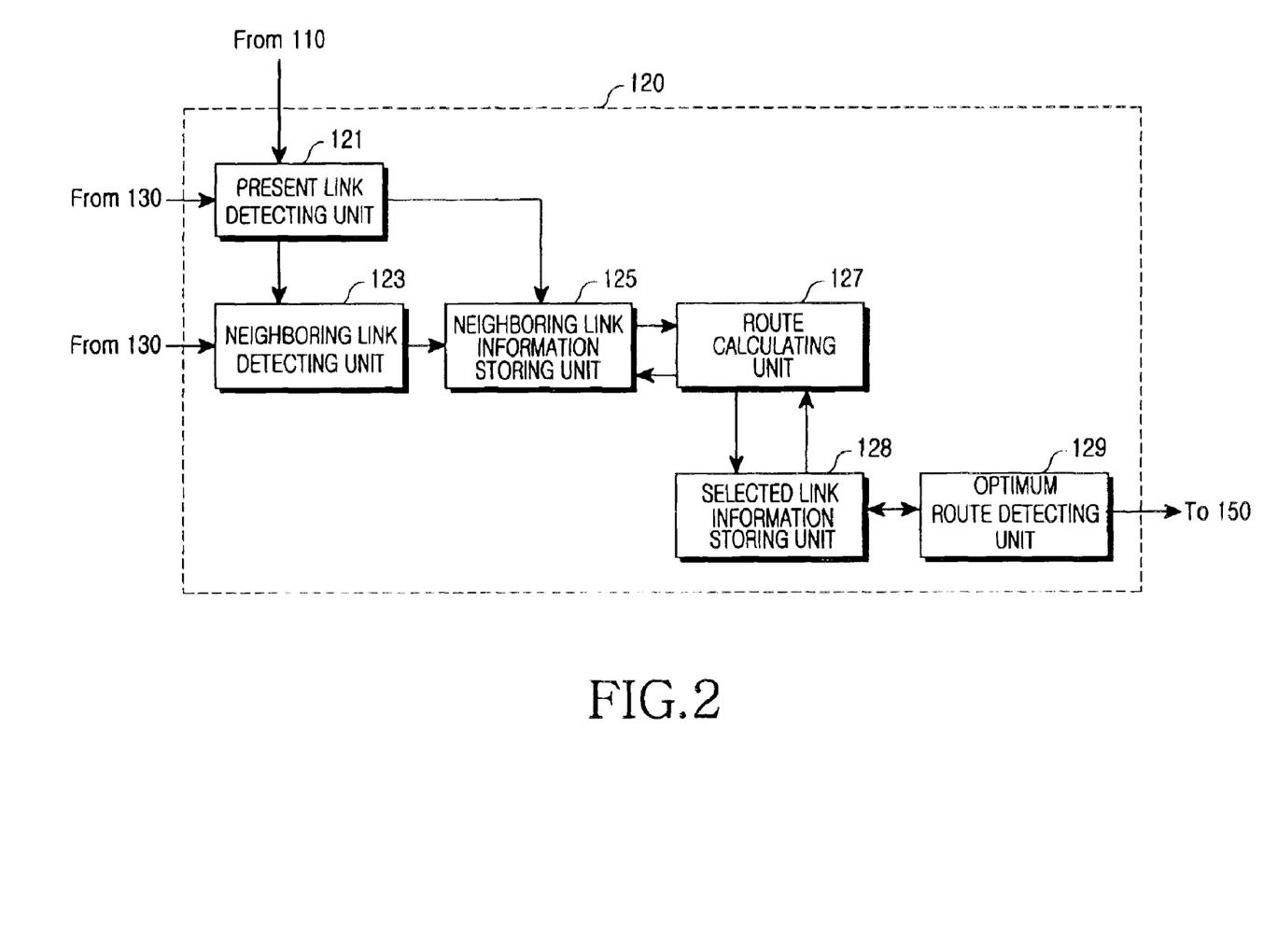
FIG. 2 is a block diagram of an essential part of a navigation apparatus in accordance with one embodiment of the present invention.

FIG. 2 is a block diagram of an essential part of a navigation apparatus in accordance with one embodiment of the present invention. That is, FIG. 2 is a block diagram of a navigation controller 120 of the navigation apparatus 100 in accordance with one embodiment of the present invention.

With reference to FIGS. 1 and 2, the navigation controller 120 includes a present link detecting unit 121, a neighboring link detecting unit 123, a neighboring link information storing unit 125, a route calculating unit 127, a selected link information storing unit 128, and an optimum route detecting unit 129. The navigation controller 120 detects an optimum travel route using present location information provided from the present location detecting unit 110 and map data provided from the map information memory 130. Then, the navigation controller 120 displays the detected optimum travel route on the displaying unit 150.

First, a user inputs a request for an optimum travel route to a designated destination via the manipulating unit 160. The present location detecting unit 110 detects a present location information of the user's vehicle in response to the optimum travel route request. The present location detecting unit 110 transmits the detected present location information to the navigation controller 120.

The present link detecting unit 121 of the navigation controller 120 receives the present location information from the present location detecting unit 110. The present link detecting unit 121 detects present link information corresponding to the present location of the movable body from the map data already stored in the map information memory 130.

The neighboring link detecting unit 123 receives the present link information from the present link detecting unit 121. Then, the neighboring link detecting unit 123 detects information corresponding to links neighboring the present link from the map data stored in the map information memory 130. The neighboring link detecting unit 123 detects information of all the links neighboring the present link in the direction of the destination according to location and direction information of the links stored in the map data.

The neighboring link information storing unit 125 receives detected results from each of the present link detecting unit 121 and the neighboring link detecting unit 123, and stores the received results therein. The selected link information storing unit 128 stores one neighboring link information selected as an optimum neighboring link information out of the information of the neighboring links stored in the neighboring link information storing unit 125, after a determination made by the route calculating unit 127.

The route calculating unit 127 receives the present link information and information of the neighboring links from the neighboring link information storing unit 125. Then, the route calculating unit 127 uses predetermined weighted values assigned to each of the available traveling directions of the present link information and the neighboring link information, thus calculating a cumulative travel time of the movable body. That is, when the movable body moves from the present link into a neighboring link according to the present link information and the information of the neighboring links, the route calculating unit 127 determines whether the traveling direction of the movable body has changed or not. Where the traveling direction of the movable body has changed, the cumulative travel time includes virtual time information differently designated according to predetermined weighted values assigned to each of the possible changed traveling directions. For example, when the movable body makes a right turn so as to move from the present link into a neighboring link, and a virtual time for making the right turn is designated as 1 minute, the virtual time (1 minute) is added to the travel time calculated according to the distance of the corresponding neighboring link and the mean traveling speed. The added total time is detected as a cumulative travel time of the corresponding neighboring link.

Where it is assumed that the driver prefers a straight drive, a right turn, a left turn, and a U-turn in order, it is preferable that the virtual times of the straight drive, the right turn, the left turn, and the U-turn are individually assigned predetermined weighted values of 0, 1, 2, and 3. Such a predetermination induces the drivers to drive their cars in the preferable direction through the travel route.

The route calculating unit 127 compares the cumulative travel times to one another, and then selects the optimum neighboring link according the comparison result. The information of the selected optimum neighboring link is stored in the selected link information storing unit 128. The route calculating unit 127 calculates the cumulative travel time taken to travel from the present location of the movable body to each of the neighboring links until the neighboring link information including a destination information is stored in the selected link information storing unit 128, thereby repeatedly performing a process for selecting the optimum neighboring link information. Here, the route calculating unit 127 sets the neighboring link information finally stored in the selected link information storing unit 128 as a present link information. After the information of links neighboring the present link are stored in the neighboring link information storing unit 125, the route calculating unit 127 calculates the cumulative travel time according to the information stored in the neighboring link information storing unit 125.

In order to prevent the vehicle from deviating from the optimum travel route in the range of the departure point, the route calculating unit 127 uses weighted values assigned to a node being in the predetermined range of the departure point, being higher than the predetermined weighted values.

The optimum route detecting unit 129 determines whether the neighboring link information including the destination information is stored in the selected link information storing unit 128. When the neighboring link information including the destination information is stored in the selected link information storing unit 128, the optimum route detecting unit 129 detects information of the all neighboring links from the link including the destination to the departure point from the selected link information storing unit 128, and then outputs an optimum travel route according to the detected information to the display unit 150.

Figure 3A:
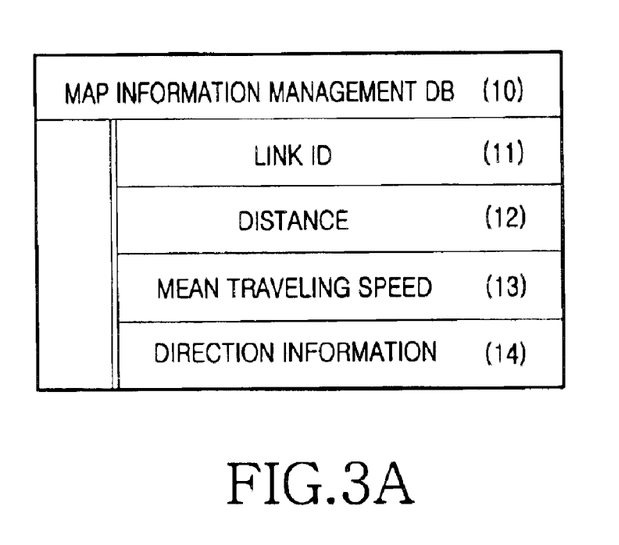
FIG. 3a is a schematic view of the arrangement of a map information management database in accordance with one embodiment of the present invention.
Figure 3B:
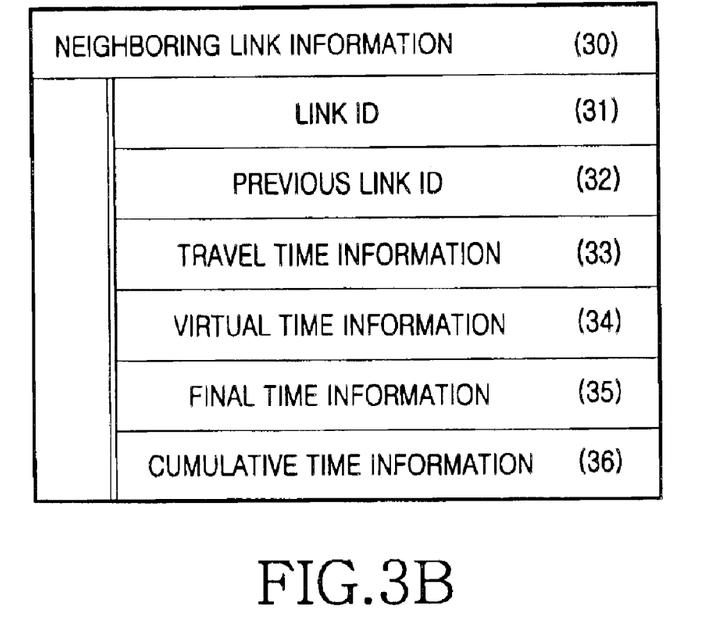
FIG. 3b is a schematic view of the arrangement of a neighboring link information database in accordance with one embodiment of the present invention.
Figure 3C:
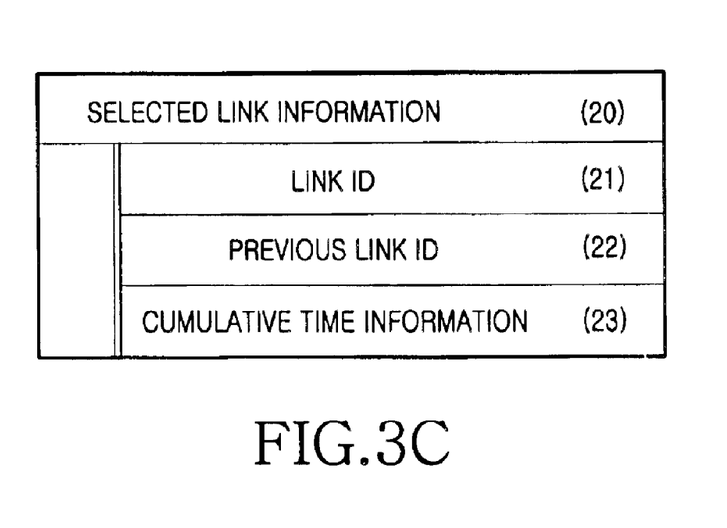
FIG. 3c is a schematic view of the arrangement of a selected link information database in accordance with one embodiment of the present invention.

FIGS. 3a to 3c illustrate information required to calculate an optimum travel route using the navigation apparatus in accordance with one embodiment of the present invention.

FIG. 3a is a schematic view of the arrangement of a map information management database (DB) 10 in accordance with one embodiment of the present invention. With reference to FIGS. 1 and 3a, map data managed by the map information memory 130 includes a link ID 11, a distance 12, a mean traveling speed 13, and direction information 14. The distance 12 is a length of a corresponding link. The mean traveling speed 13 is a mean traveling speed of the corresponding link. The direction information 14 is a traveling direction information of the corresponding link.

FIG. 3b is a schematic view of the arrangement of a neighboring link information database in accordance with one embodiment of the present invention. With reference to FIGS. 2 and 3b, neighboring link information 30 managed by the neighboring link information storing unit 125 includes a link ID 31, a previous link ID 32, a travel time information 33, a virtual time information 34, a final time information 35, and a cumulative time information 36.

FIG. 3c is a schematic view of the arrangement of a selected link information database in accordance with one embodiment of the present invention. With reference to FIGS. 2 and 3c, selected link information 20 managed by the selected link information storing unit 128 includes a link ID 21, a previous link ID 21, and a cumulative time information 23.

Figure 4:
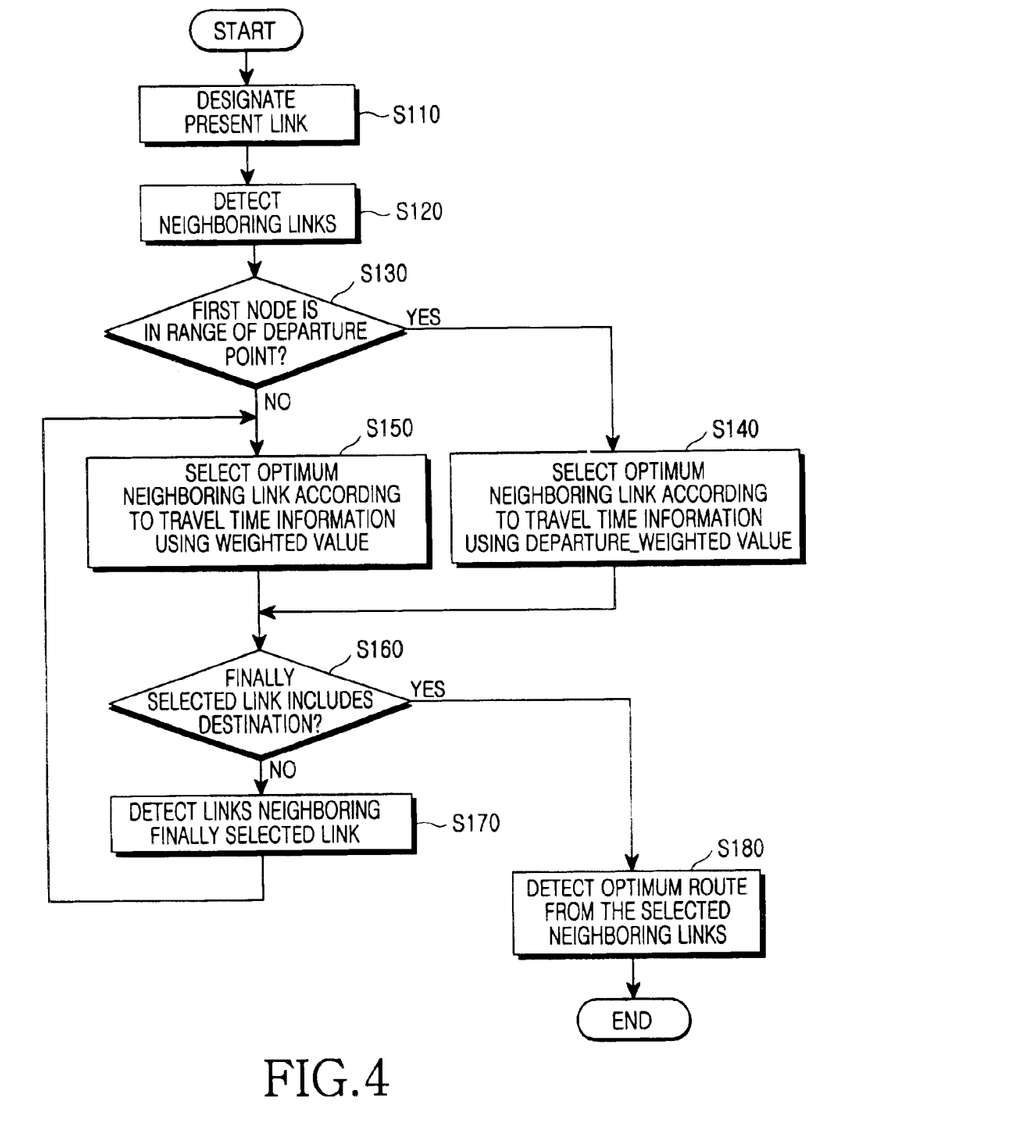
FIG. 4 is a flow chart of a method for calculating an optimum travel route using the navigation apparatus in accordance with one embodiment of the present invention.

FIG. 4 is a flow chart of a method for calculating an optimum travel route using the navigation apparatus in accordance with one embodiment of the present invention. With reference to FIGS. 2 and 4, the method for calculating the optimum travel route using the navigation apparatus in accordance with one embodiment of the present invention is described, as follows.

When a driver of a movable body (hereinafter, referred to as a "vehicle") provided with the navigation apparatus of the present invention requests an optimum travel route from the present location to a desired destination, the present location detecting unit 110 of the navigation apparatus detects a present location information of the vehicle. The present link detecting unit 121 detects a present link information corresponding to the above-detected present location from the stored map data at step S110. The neighboring link detecting unit 123 receives the present link information from the present link detecting unit 121, and detects information of all links neighboring the present link in the direction of the destination from the stored map data at step 120. Then, the neighboring link detecting unit 123 stores the detected neighboring link information in the neighboring link information storing unit 125.

While calculating the route from the departure point to the destination, the route calculating unit 127 determines whether a first node is in the range of the designated departure point at step S130. When the first node is not in the range of the designated departure point, an optimum neighboring link is selected according to a travel time information obtained using the weighted values at step S150. Here, in order calculate the travel time information using the weighted values, virtual time information assigned to each of the weighted values is used.

When the first node is in the range of the designated departure point at step S130, an optimum neighboring link is selected according to travel time information obtained using weighted values (departure-weighted values) which are higher than the above predetermined weighted values, at step S140. This prevents the vehicle from deviating from the optimum travel route in the range of the departure point.

Whether the finally selected link is a link including the destination information is determined at step S160. Neighboring links of the finally selected link are detected at step S170, until the finally selected link includes the destination. Then, an optimum neighboring link is repeatedly selected from the neighboring links at step S180 using the weighted values. When the finally selected link includes the destination at step S160, an optimum travel route from the neighboring links is detected and then outputted at step S180.

That is, the optimum route detecting unit 129 determines whether the link information stored in the selected link information storing unit 128 includes the information of the link including the destination. When the stored link information includes the link information having the destination information, the optimum route detecting unit 129 tracks the neighboring links stored in the selected link information storing unit 128 from the link including the destination to the departure point, thus detecting the optimum travel route.

Figure 5:
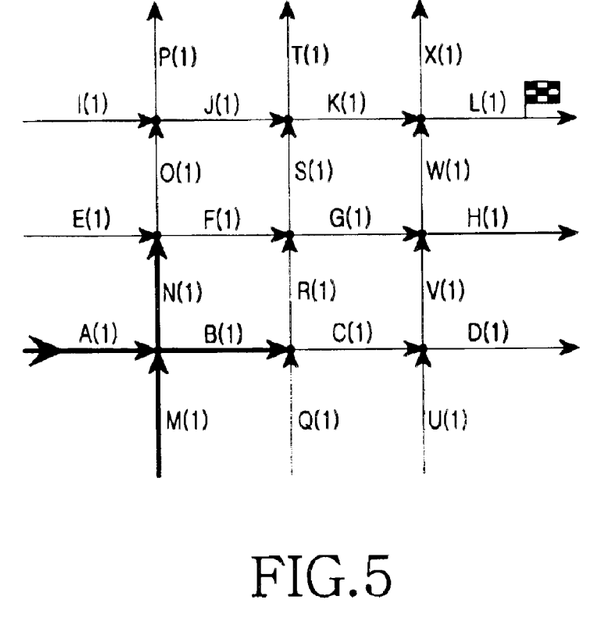
FIG. 5 is a schematic view of a present link and neighboring links detected by the navigation apparatus in accordance with one embodiment of the present invention.
Figure 6:
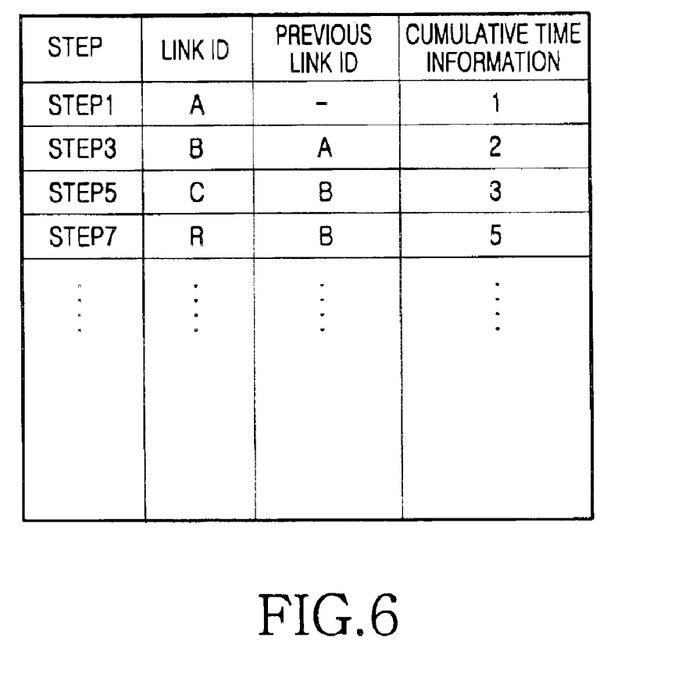
FIG. 6 illustrates an example of information stored in a selected link information storing unit at each step for calculating the optimum travel route through the links in the range of FIG. 5.
Figure 7:
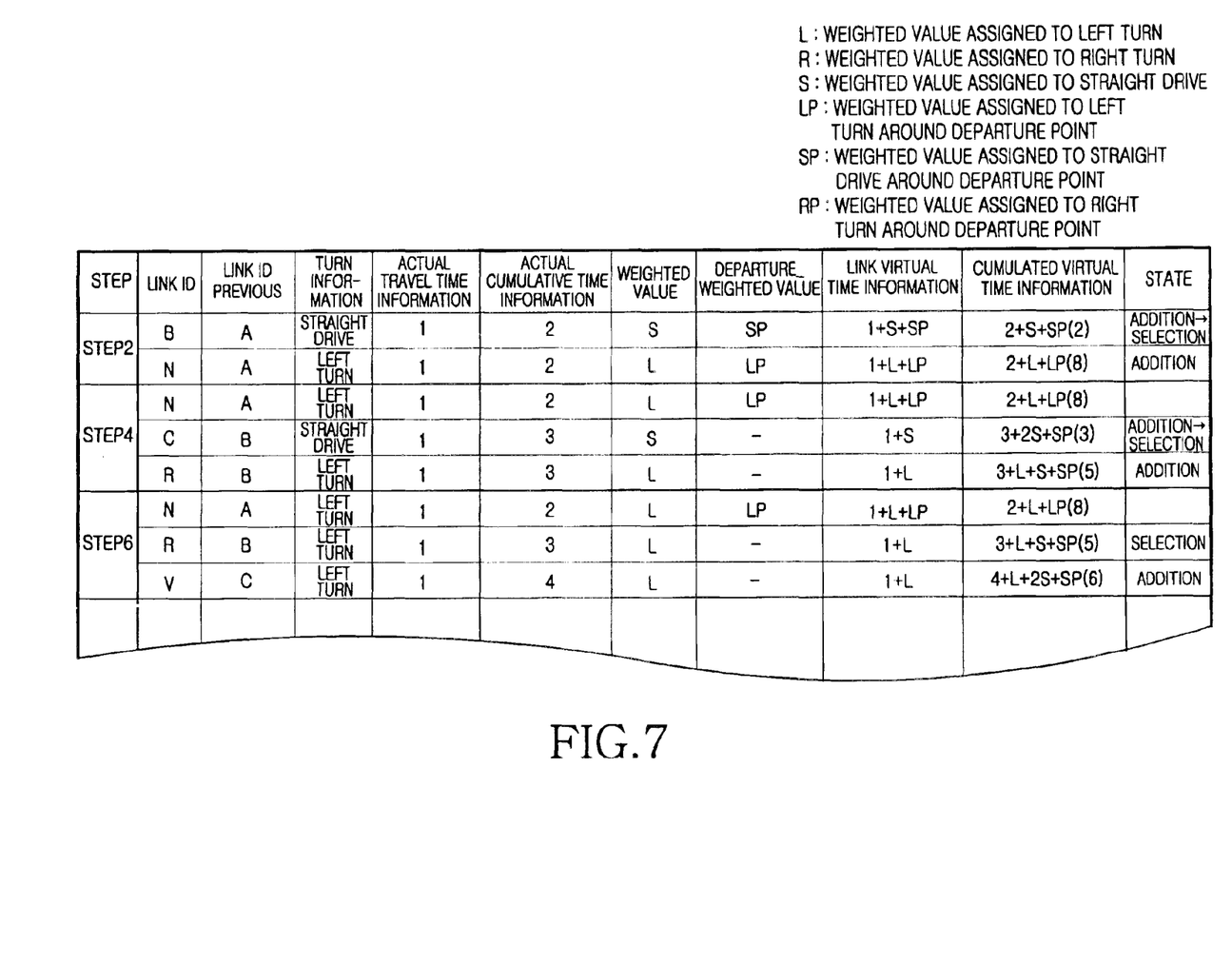
FIG. 7 illustrates an example of information stored in a neighboring link information storing unit at each step for calculating the optimum travel route through the links in the range of FIG. 5.

FIGS. 5 to 7 illustrate an exemplary process for calculating the optimum travel route in accordance with one embodiment of the present invention.

FIG. 5 is a schematic view of a present link and neighboring links detected by the navigation apparatus in accordance with one embodiment of the present invention. In FIG. 5, nine nodes (●) divide an area into links (travel routes) managed by the navigation apparatus, and arrows (→) between the nodes (●) denote traveling directions. Alphabetic letters printed above the arrows are identifiers of the corresponding links, and Arabic numbers in brackets next to the identifiers denote travel time information of the corresponding links. In the example of FIG. 5, the travel time information of the links are all designated to have weights of '1'. A large arrow (≃) printed above the link A represents the present location of the vehicle.

FIGS. 6 and 7 illustrate examples of information stored in the selected link information storing unit (128 of FIG. 2) and the neighboring link information storing unit (125 of FIG. 2) of each step for calculating the optimum travel route through the links of FIG. 5.

With reference to FIG. 6, at step 1, the information of a link of the present location of the vehicle (link A) is stored in the selected link information storing unit (128 of FIG. 2). The contents of the stored information of the link A are shown in FIG. 6. With reference to FIG. 7, at step 2, the information of links (links B and N) neighboring the link A stored in the selected link information storing unit (128 of FIG. 2) are stored in the neighboring link information storing unit (125 of FIG. 2). The contents of the information of the links B and N are shown in FIG. 7. That is, the neighboring link information storing unit (125 of FIG. 2) stores the ID of the corresponding link, the ID of the previous link, turn information, actual travel time information, actual cumulative time information, the weighted value, the departure_weighted value, link virtual time information, cumulative virtual time information, and state information.

The actual cumulative time information is a value obtained by accumulating the travel time of the current link and the travel time of the previous links. The weighted values are assigned to each of the available traveling directions, such as the left turn, the right turn, the straight drive, etc. In the example of FIG. 7, the weighted value assigned to the left turn is represented as 'L', and the weighted value assigned to the right turn is represented as 'R'. The weighted value assigned to the straight drive is represented as 'S'. In calculating the cumulative time, the above weighted values are converted into numerical values.

The departure_weighted values are values assigned only to a node being in the range of the predetermined departure point. The departure_weighted value prevents the vehicle from deviating from the optimum travel route in the range of the departure point.

In FIG. 7, the cumulative virtual time information at each step, shown in brackets, are results obtained by calculating the cumulative virtual time, where the weighted value (L) assigned to the left turn is '2', the weighted value (R) assigned to the right turn is '1', the weighted value (S) assigned to the straight drive is '0', the weighted value (LP) assigned to the left turn around the departure point is '4', the weighted value (RP) assigned to the right turn around the departure point is '2', and the weighted value (SP) assigned to the straight drive around the departure point is '0'.

At step 2 of FIG. 7, the link B is selected. As shown in step 3 of FIG. 6, the selected link B is stored in the selected link information storing unit. At step 4 of FIG. 7, the link C is selected. As shown in step 5 of FIG. 6, the selected link C is stored in the selected link information storing unit. At step 6 of FIG. 7, the link R is selected. As shown in step 7 of FIG. 6, the selected link R is stored in the selected link information storing unit.

As described above, the cumulative time information from the departure point to each of all the neighboring links is obtained using the departure_weighted values and the weighted values. An optimum link is selected according to the cumulative time information and then stored in the selected link information storing unit. When the link finally stored in the selected link information storing unit includes the destination (link L in FIG. 5), the route from the finally stored link including destination to the departure point is tracked and detected as an optimum travel route.

As apparent from the above description, the present invention provides a navigation apparatus and a method for calculating an optimum travel route using the navigation apparatus, in which the optimum travel route from a present location of a vehicle to a desired destination is determined using predetermined weighted values assigned to a present link and neighboring links on a map according to directions, thereby improving the probability that the vehicle requesting the optimum travel route is in the range of the optimum travel route provided by the navigation apparatus. Further, the navigation apparatus of the present invention considers the actual travel time as well as the travel distance, thereby providing a reliable optimum travel route.

Although only a few embodiments of the present invention have been described in detail, those skilled in the art will appreciate that various modifications, additions, and substitutions to the specific elements are possible, without departing from the scope and spirit of the invention as disclosed in the accompanying claims.

What is claimed is:

1. A navigation apparatus comprising:
   a present location detecting unit for detecting a present location information of a movable body in response to a user's request for an optimum travel route to a designated destination;
   a present link detecting unit for receiving the present location information from the present location detecting unit, and detecting a present link information corresponding to the present location from stored map data;
   a neighboring link detecting unit for receiving the present link information from the present link detecting unit, and detecting information of neighboring links of the present link from the stored map data;
   a neighboring link information storing unit for receiving and storing therein the detected results from the present link detecting unit and the neighboring link detecting unit;
   a selected link information storing unit for storing an optimum neighboring link information selected out of the information of the neighboring links stored in the neighboring link information storing unit;
   a route calculating unit for receiving the present link information and the information of the neighboring links from the neighboring link information storing unit, calculating a cumulative travel time from the present location of the movable body to each neighboring link using predetermined weighted values assigned to a traveling direction of each of the present link information and the information of the neighboring links, selecting an optimum neighboring link information, and storing the selected optimum neighboring link information in the selected link information storing unit; and
   an optimum route detecting unit for determining whether the selected link information storing unit stores the link information including a destination information, detecting the link information including the destination information from the selected link information storing unit and information of the neighboring links from a link including the destination to a departure point, and outputting an optimum travel route.

2. The navigation apparatus as set forth in claim 1, wherein the neighboring link detecting unit detects information of all the links neighboring the present link in the direction of the destination according to location and direction information of each of the links stored in the map data.

3. The navigation apparatus as set forth in claim 1, wherein the route calculating unit calculates the cumulative travel time from the present link to a corresponding neighboring link using a weighted value assigned to a node being in the range of the departure point, being higher than the predetermined weighted value.

4. The navigation apparatus as set forth in claim 3, wherein the route calculating unit sets a virtual time information according to the weighted values, and calculates the cumulative travel time from the present link to the corresponding neighboring link according to the set virtual time information.

5. A method for calculating an optimum travel route using a navigation apparatus, comprising the steps of:
   a) detecting present location information of a movable body in response to a user's request for the optimum travel route to a designated destination;
   b) detecting present link information corresponding to the present location information of the movable body from stored map data;
   c) detecting information of links neighboring the present link in the direction of the destination from the map data;
   d) calculating a cumulative travel time from the present location of the movable body to each neighboring link using the predetermined weighted values assigned to each of traveling directions of the present link information and the information of the neighboring links;
   e) selecting one optimum neighboring link information out of the neighboring link information detected from the map data according to the calculated cumulative travel time of each neighboring link; and
   f) repeating steps c) to e), subsequently detecting the optimum travel route from the selected optimum neighboring link information when a finally selected optimum neighboring link information includes destination information, and outputting the detected optimum travel route.

6. The method for calculating an optimum travel route using a navigation apparatus as set forth in claim 5, wherein at step c), information of all links neighboring the present link in the direction of the destination are detected according to location and direction information of each of the links stored in the map data.

7. The method for calculating an optimum travel route using a navigation apparatus as set forth in claim 5, wherein at step d), the cumulative travel time from the present link to a corresponding neighboring link is calculated using a weighted value assigned to a node being in the range of the predetermined departure point, being higher than the predetermined weighted value.

8. The method for calculating an optimum travel route using a navigation apparatus as set forth in claim 7, wherein at step d), a virtual time information is set according to the weighted values, and the cumulative travel time from the present link to the corresponding neighboring link is calculated according to the set virtual time information.

* * * * *